United States Patent [19]

Honig et al.

[11] Patent Number: 5,481,533
[45] Date of Patent: Jan. 2, 1996

[54] HYBRID INTRA-CELL TDMA/INTER-CELL CDMA FOR WIRELESS NETWORKS

[75] Inventors: Michael L. Honig, Bloomfield; Upamanyu Madhow, Morristown, both of N.J.

[73] Assignee: Bell Communications Research, Inc., Livingston, N.J.

[21] Appl. No.: 241,928

[22] Filed: May 12, 1994

[51] Int. Cl.⁶ ............................ H04B 7/204; H04B 15/00; H04J 13/04; H04L 27/30
[52] U.S. Cl. .......................... 370/18; 370/95.3; 375/205; 375/206; 375/207; 375/210; 455/33.1; 455/51.1; 455/56.1
[58] Field of Search ................................... 370/18, 19, 20, 370/23, 95.1, 95.3, 100.1; 379/59, 60; 455/33.1, 33.2, 34.1, 49.1, 50.1, 51.1, 53.1, 54.1, 56.1, 63; 375/200, 205, 206, 207, 208, 210, 343, 346, 349, 350, 356

[56] References Cited

U.S. PATENT DOCUMENTS

| | | | |
|---|---|---|---|
| 4,567,588 | 1/1986 | Jerrim | 370/18 |
| 4,601,047 | 7/1986 | Horwitz et al. | 370/18 |
| 4,688,210 | 8/1987 | Eizenhöfer et al. | 370/18 |
| 4,765,753 | 8/1988 | Schmidt | 379/60 |
| 5,099,493 | 3/1992 | Zeger et al. | 375/1 |
| 5,260,967 | 11/1993 | Schiling | 375/1 |
| 5,319,634 | 6/1994 | Bartholomew et al. | 370/18 |
| 5,343,496 | 8/1994 | Honig et al. | 375/1 |

OTHER PUBLICATIONS

"Indoor Radio Communications Using Time–Division Multiple Access with Cyclical Slow Frequency Hopping and Coding", Adel A. M. Saleh, Leonard J. Cimini, Jr., IEEE Journal on Selected Areas in Communications, vol. 7, NO. 1, Jan., 1989, pp. 59–70.

"Universal Digital Portable Radio Communications", Donald C. Cox, Proceedings of the IEEE, vol. 75, No. 4, Apr. 1987.

Primary Examiner—Alpus Hsu
Attorney, Agent, or Firm—Leonard Charles Suchyta; Joseph Giordano

[57] ABSTRACT

In a cellular network, a multiple-access methodology and concomitant circuitry in which TDMA is used inside each cell and CDMA signals, having pulse shapes with low cross-correlations, are assigned to adjacent cells. For example, these pulses could be Direct-Sequence Spread-Spectrum pulses. Such a hybrid system combines the high intra-cell capacity of TDMA with the inter-cell and multipath interference rejection capabilities of CDMA.

18 Claims, 10 Drawing Sheets

HYBRID INTRA-CELL TDMA/INTER-CELL CDMA FOR WIRELESS NETWORKS

FIELD OF THE INVENTION

This invention relates generally to digital systems and, more specifically, to a methodology for communicating in wireless cellular networks using a hybrid of Time-Division Multiple-Access/Code-Division Multiple-Access (TDMA/CDMA).

BACKGROUND OF THE INVENTION

A conventional cellular mobile/radio system is composed of numerous mobile units, such as handsets operated by individual users, which home-on associated base stations. A single base station serves a number of mobile units that lie within a simply connected geographical area-a cell-identified to that single base unit.

The enormous potential demand for wireless communication services combined with a limited amount of available radio spectrum has motivated extensive study of bandwidth-efficient, multiple-access techniques for wireless applications. Two such techniques that have been widely proposed for wireless cellular applications, such as mobile cellular and Personal Communication Services (PCS), are Time-Division Multiple-Access (TDMA) and Code-Division Multiple-Access (CDMA). Each offers advantages and disadvantages, which vary in degree of importance, depending on the application, expected traffic types, channel characteristics, allowed complexity, and network configuration. However, the prior art is devoid of teachings or suggestions on an inter-dependent combination of TDMA and CDMA that advantageously utilizes the primary characteristics of each technique.

SUMMARY OF THE INVENTION

In accordance with the present invention, a methodology for communicating in a cellular network with a hybrid, multiple-access arrangement combines both TDMA and CDMA is disclosed. Specifically, intra-cell multiple-access is achieved via TDMA, and inter-cell interference is suppressed via CDMA.

Broadly, in accordance with a method aspect of the present invention, a cellular communication network composed of a plurality of base stations having numerous mobile units homing on each base station propagates intra-cellular TDMA signals in synchronized time slots, and propagates intercellular CDMA signals in the time slots. The CDMA signals are detected with either a matched filter receiver or an interference suppression receiver (the latter would be used when maximal network capacity is required). Exemplary of the CDMA signals are Direct Sequence Spread-Spectrum (DS-SS) signals.

A feature of the methodology, in contrast to the standard TDMA/Frequency-Division Multiple-Access (FDMA) technique in which inter-cell interference is suppressed by making sure that users in adjacent cells are transmitting on different frequency bands, is that the hybrid TDMA/CDMA scheme combines the high intra-cell capacity of TDMA with the inter-cell and multipath interference rejection capabilities of CDMA.

The organization and operation of this invention will be better understood from a consideration of the detailed description of the illustrative embodiment thereof, which follows, when taken in conjunction with the accompanying drawing.

DETAILED DESCRIPTION

In this description, so as to gain an insight into the underlying principles in accordance with the present invention, the hybrid TDMA/CDMA method is initially described in overview fashion. Then, the relationship between TDMA and CDMA parameters for a specific CDMA technique, namely, Direct-Sequence Spread-Spectrum (DS-SS), is discussed. Finally, the use of interference suppression techniques to suppress inter-cell interference is discussed.

Figure 1:
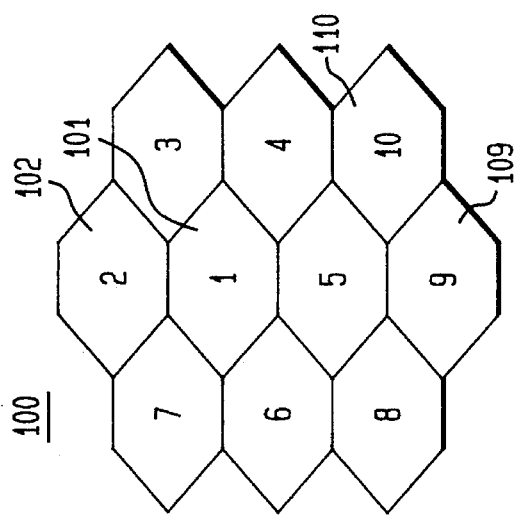
FIG. 1 depicts an arrangement of communication cells for a general cellular network.
Figure 2:
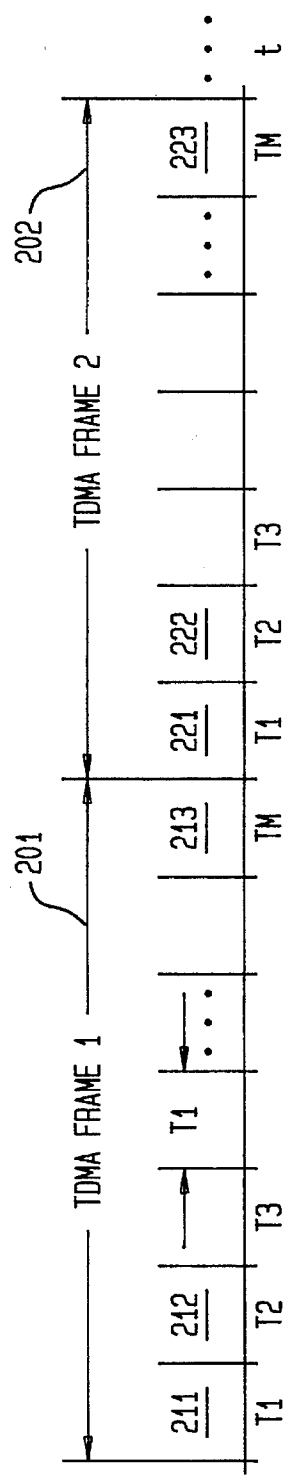
FIG. 2 depicts a layout of contiguous time frames subdivided into time slots assigned to individual users.

The general cellular network arrangement 100 under consideration is depicted in block diagram form in FIG. 1. Within each cell 101, 102 . . . , or 110 (cell 1, cell 2, . . . , cell 10, respectively), the standard TDMA format is employed to communicate between a base station and its associated mobile units (not shown in FIG. 1, but shown and discussed shortly with reference to FIG. 3). Thus, as depicted in FIG. 2, each TDMA communication channel between a base station and each of its associated mobile units is divided into frames 1, 2, . . . (reference numerals 201, 202, . . . , respectively) to support a number of users. In turn, each frame is subdivided into time slots T1 (reference numeral 211 in frame 1, 221 in frame 2, . . . ), T2 (212 and 222 in frames 1 and 2, . . . ), . . . , TM (213 and 223 in frames 1 and 2, . . . ) for a maximum of M users; each time slot is of duration T seconds. Each active user is typically assigned to one time slot per frame.

Figure 3A:
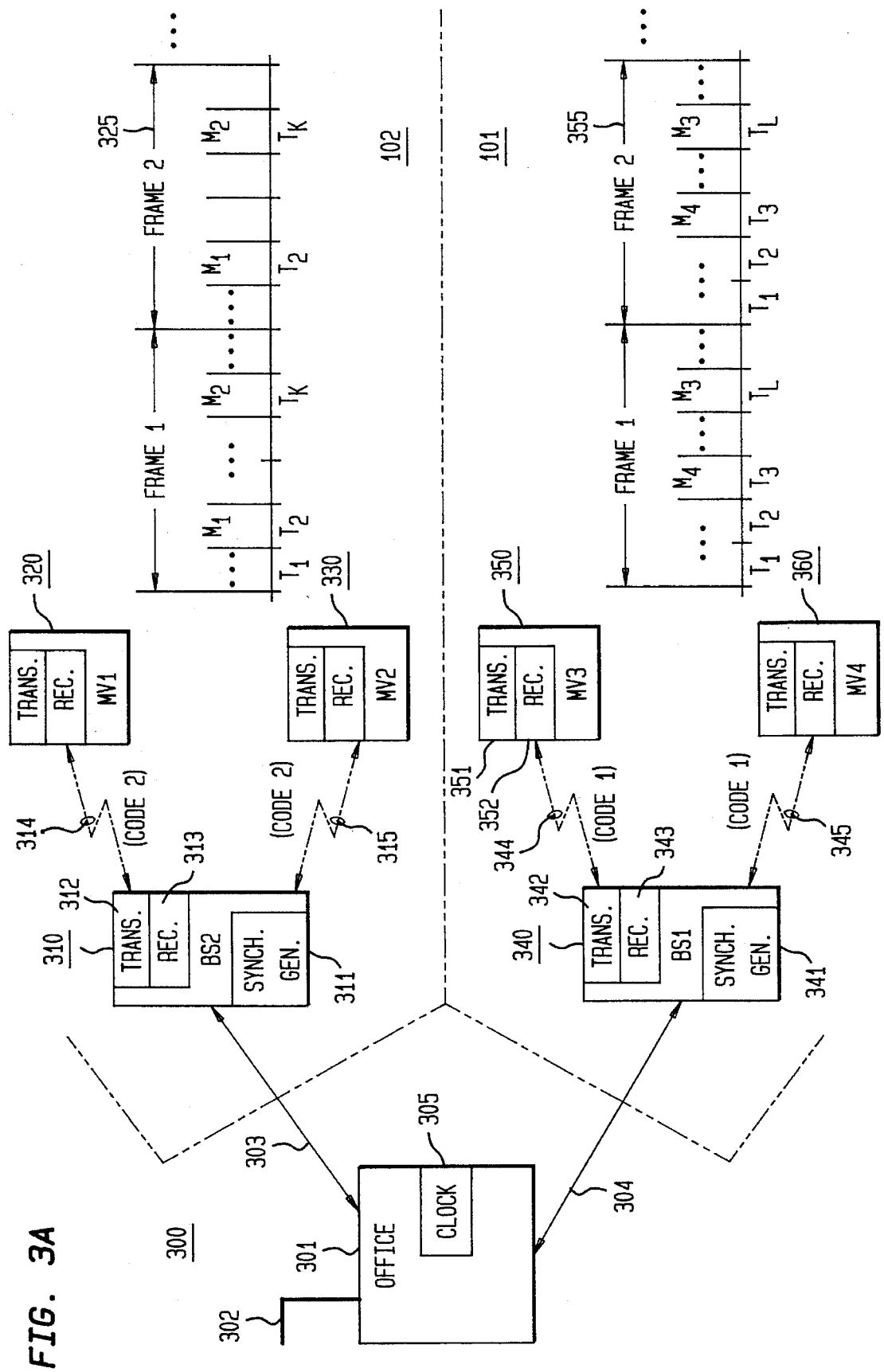
FIGS. 3(a), 3(b)(i)–(iii), 3(c) and 3(d) illustrate block diagrams of circuitry for cellular communication in accordance with the present invention.

With reference to FIG. 3(a), cellular arrangement 100 of FIG. 1 is depicted from another viewpoint, namely, circuitry 300, in block diagram form, is used to communicate in both the downlink (base station-to-mobile unit) direction and the uplink (mobile unit-to-base station) direction. Serving office 301 is used to switch incoming and outgoing signals from the cellular arrangement - either inter-cell signals propagating to or from cell 101 and cell 102 shown in FIG. 3(a), or signals arriving from or destined for another serving office (not shown) via communication link 302. Base stations 310 and 340 (BS2 and BS1, respectively) are connected to serving office 301 via communication links 303 and 304, respectively; these links are usually high bandwidth links. Base station 310 is shown as serving mobile units 320 and 330 (MU1 and MU2, respectively). Also, base station 340 serves mobile units 350 and 360 (MU3 and MU4, respectively). A sequence of frames, commensurate with that shown in FIG. 2, is depicted as frame sequence 325 associated with base station 310. Similarly, a sequence of frames associated with base station 340 is shown as frame sequence 355.

Time slots in frames such as frames 325 and 355 are synchronized across all cells controlled by a given serving office such as office 301. Synchronization is a conventional function for any system employing TDMA; synchronization is effected by implementing clock 305 in serving office 301. In turn, the clock signal from clock 305 is propagated to each base station via its high-bandwidth link. For instance, synch generator 311 in base station 310 receives the clock signal and regenerates the clock signal for transmission to mobile units 320 and 330. The synch signal is, in turn, transmitted to the mobile units from transmitter 312 for timing purposes.

As will be described in more detail shortly, the CDMA code utilized within cell 101, designated code 1, is transmitted to mobile units 350 and 360 over message channels 344 and 345, respectively. A message channel is also deployed in conventional TDMA systems to pass messages between the base station and the mobile units. Similarly, the CDMA code utilized within cell 102, designate code 2, is transmitted to mobile units 320 and 330 over message channels 314 and 315, respectively.

Figures 1, 3B:
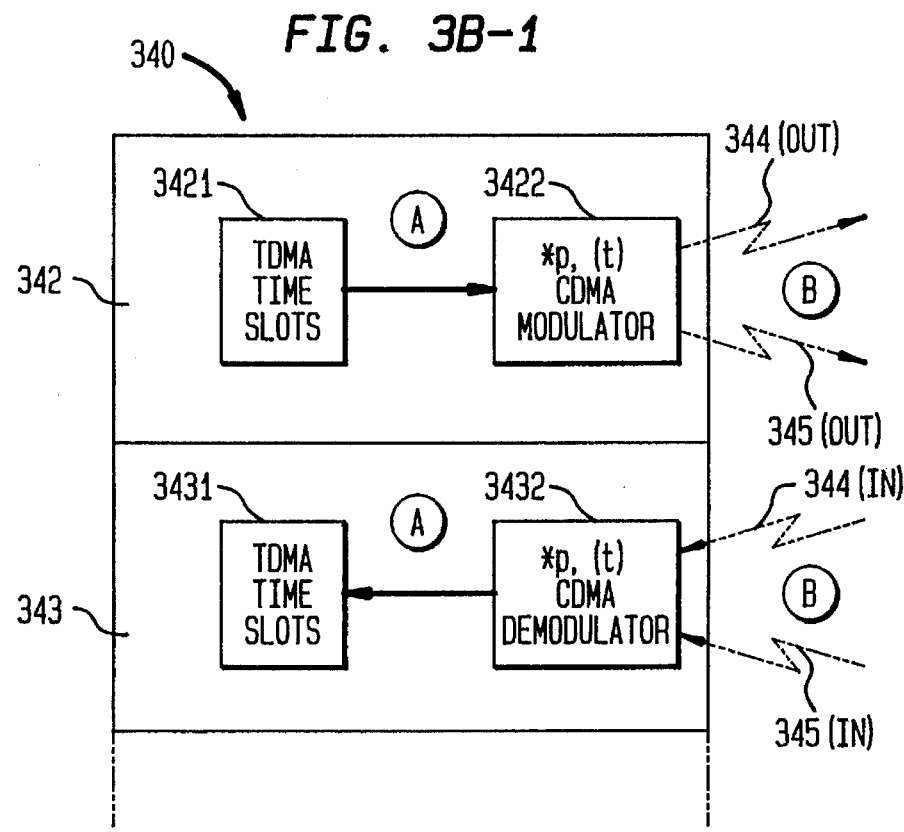
Figures 2, 3B:
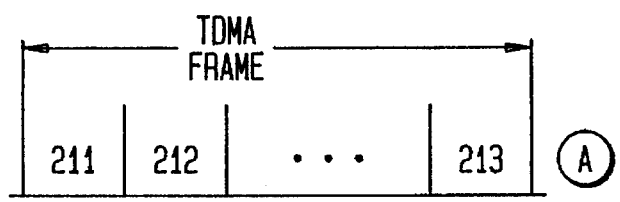
Figures 3, 3B:

As shown in frame sequence 325, an exemplary assignment of mobile units to time slots is such that mobile unit 320 is assigned to time slot 2 whereas mobile unit 330 is assigned to time slot K. Similarly, as shown in frame sequence 355, an exemplary assignment of mobile units to time slots is such that mobile unit 350 is assigned to time slot 3 whereas mobile unit 360 is assigned to time shot L (perhaps different than K). Transmissions from base station 310 are accomplished via transmitter 312, coupled to an antenna (not shown), whereas received signals are detected at base station 310 over receiver 313, which is also coupled to the antenna. Similarly, transmissions from base station 340 are accomplished via transmitter 342, coupled to an antenna (not shown), whereas received signals are detected at base station 340 over receiver 343, which is also coupled to the antenna. Each mobile unit in the system has a commensurate transmitter-receiver pair (e.g., transmitter 351 and receiver 352 of mobile unit 350). Since the downlink and uplink directions may basically use the same type of transmitter-receiver combination, the focus of the immediate discussion is on one direction, say the uplink direction, and in particular, the type of receiver (e.g., receiver 313 or 343) to provide for interference suppression, as discussed in more detail shortly. By way of elucidating aspects of FIG. 3(a) in terms of known communications techniques, reference is now made to FIG. 3(b), which shows the details of an exemplary base station 340 in FIG. 3(b)(i). TDMA/CDMA frames required of the inventive subject matter may be translated directly to or from TDMA/FDMA frames. At base station transmitter 342, each TDMA times slot's symbols generated in generator 3421 can be modulated by the CDMA waveform serving as an in to modulator 3422. The modulated output is then transmitted on channels 344 and 345. At the base station receiver 343, each incoming CDMA waveform received over channels 344 and 345 can be demodulated in demodulator 3432, and then converted into the symbol for that TDMA time slot in generator 3431. With this arrangement, it is immediately apparent that the base station 340 can internally handle TDMA frames with familiar TDMA/FDMA techniques, and need only convert to or from CDMA at the front end (elements 3422 and 3432). The frame of FIG. 3(b)(ii) depicts the signals appearing at points A in FIG. 3(b)(i), whereas the frame of FIG. 3(b)(iii) depicts the modulated signals appearing at points n in FIG. 3(b)(i). The same framing and interconnection structure of any conventional TDMA/FDMA radio system could be used. This structure was alluded to earlier in this section.

Figure 3C:
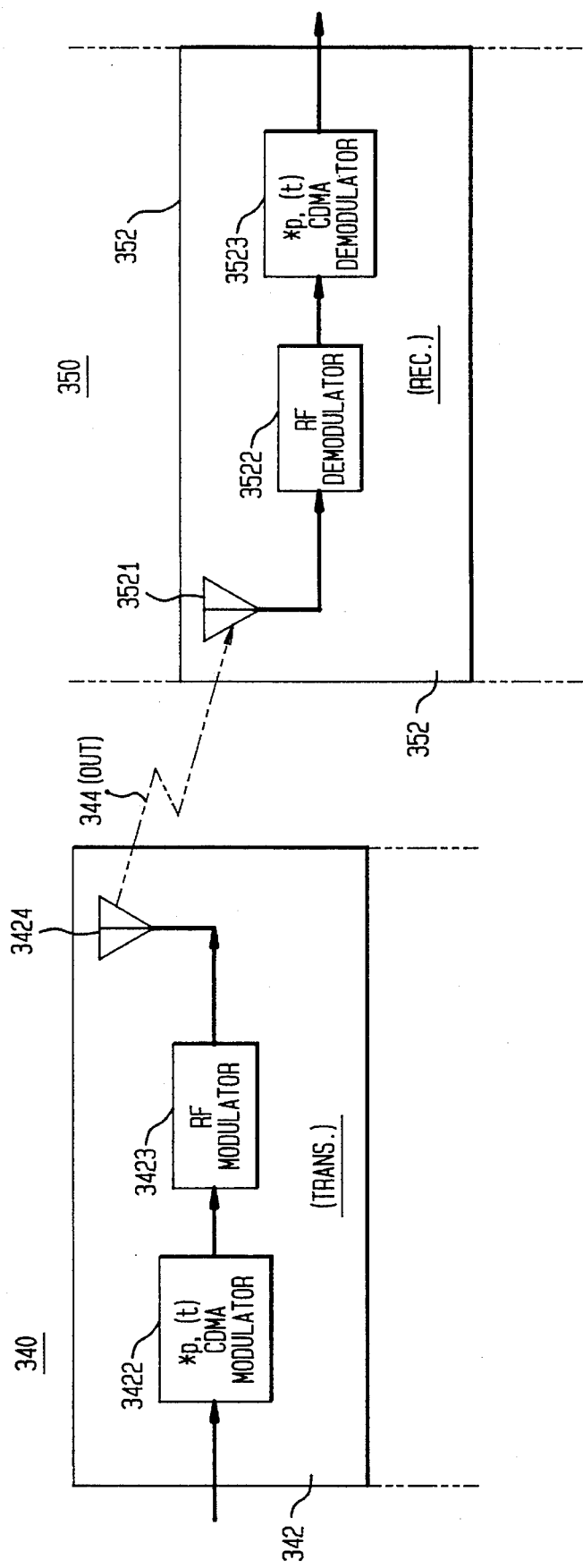

With reference to FIG. 3(c), a transmitter such as transmitter 342 modulates the baseband TDMA/CDMA signals to a radio frequency (RF) band via modulator 3423, and then propagates the modulated signals on a radio link through antenna 3424. Each receiver, such as receiver 352, detects the incoming RF signal from antenna 3521 and demodulates the RF signal, via modulator 3522, to baseband TDMA/CDMA signals.

Figure 3D:
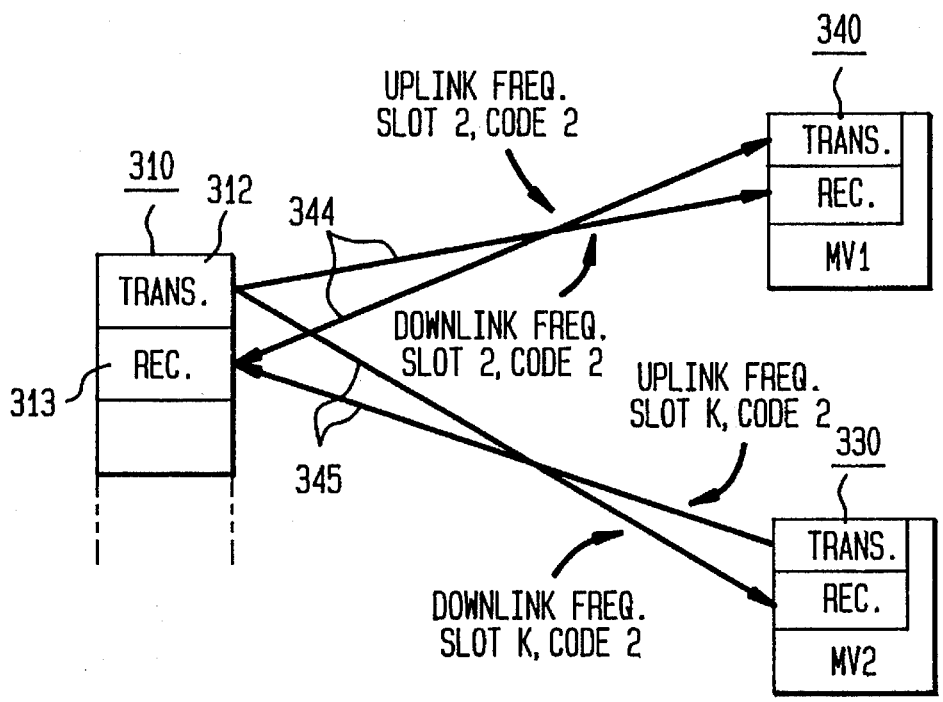
Figure 3E:
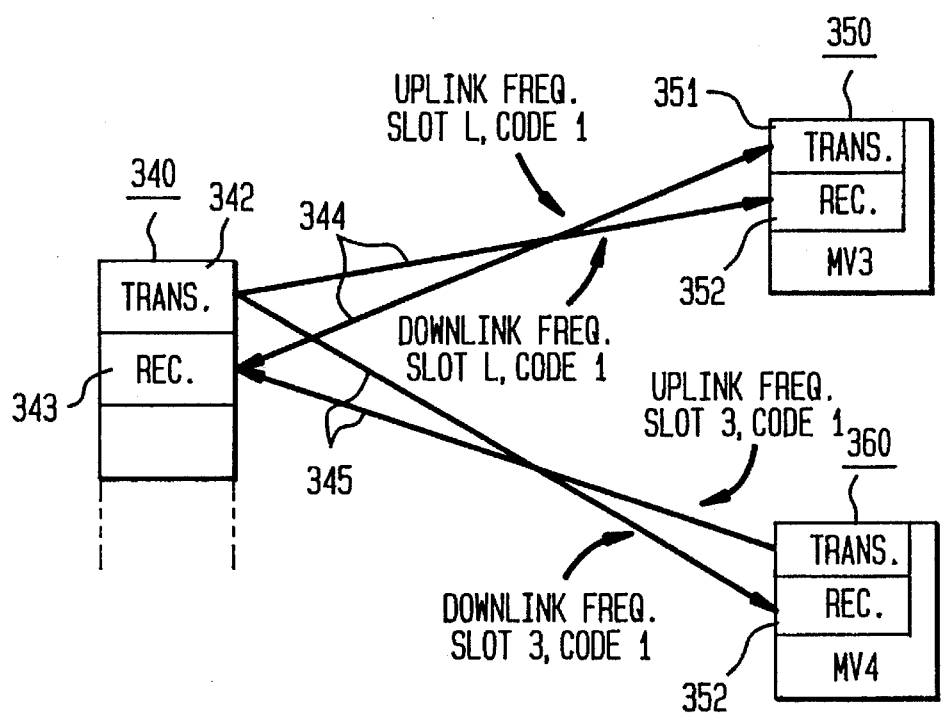

With reference to FIG. 3(d), there is shown the propagation path of each RF modulated TDMA/CDMA signal. In keeping with the protocol of conventional systems, the uplink and downlink signals use two different carrier frequencies. These RF signals therefore unambiguously propagate from the base station antenna to a mobile antenna and vice-versa in the arrangement of FIG. 3(d).

The control and management functions of system 300 are generally independent of the type of multiplexing involved in the circuitry of FIGS. 3(a)–3(d), that is, these functions are managed on a different layer than the multiplexing level; such functions are therefore generic to both the conventional techniques as well as the present invention.

It is further noted that there is no implicit difference between CDMA code identification for the TDMA/CDMA of the present invention and CDMA code identification for presently existing systems. When a mobile unit is assigned a given call, a copy of the CDMA code sequence for that cell is transmitted to that mobile unit from the corresponding base station. A typical arrangement is for each base station to continuously transmit its CDMA code sequence on a dedicated "pilot" or message time-slot. Such message time-slots with accompanying message signals are already implemented in conventional systems for handoff and power control purposes in that each mobile unit can then determine the received power from each base station for level control. The utility of the message channel was also alluded to in the foregoings.

In general terms, within a particular cell (say cell m) it is assumed that the $i^{th}$ user in cell m transmits the following pulse-amplitude modulated waveform during the user's particular time slot, $$s_m^{(i)}(t) = \sum_k b_k^{(i)} p_m(t - kT) \tag{1}$$

where $\{b_k^{(i)}\}$ is the sequence of symbols corresponding to user i, $p_m(t)$ is the transmitted pulse shape assigned to cell m, and $1/T$ is the symbol rate.

In standard TDMA/FDMA, the baseband pulse shapes corresponding to different cells are the same. Inter-cell interference is suppressed by assigning different carrier frequencies to different cells. Furthermore, the frequency bands assigned to adjacent cells are assumed to be nonoverlapping. For instance, with reference to FIG. 1, cell 101 would be assigned a frequency designated f1, whereas cells surrounding cell 101, namely, cells 102–107 have frequencies f2, ..., f7, respectively.

In TDMA/CDMA, however, inter-cell interference is suppressed by selecting different baseband pulse shapes for each cell. As an example, the baseband pulse $p_m(t)$ is considered to be a DS-SS waveform $$p_m(t) = \sum_{k=0}^{N-1} a_k^{(m)} \Psi(t - kT_c) \qquad (2)$$

where $\{a_k^{(m)}\}$ is a pseudo-random sequence of length N assigned to cell m, and $\Psi(t)$ is the chip waveform, which typically has duration $T_c = T/N$.

In TDMA/CDMA, different DS-SS spreading codes (as opposed to frequency channels in FDMA) are therefore assigned to different cells. Within each cell, all users take turns (as in TDMA) transmitting the type of signal set forth in equation (1) where the pulse shape is associated with the particular spreading sequence assigned to that cell. In addition, when a user is handed off to an adjacent cell, the spreading code (as opposed to carrier frequency in TDMA/FDMA) must therefore be changed.

Figure 4:
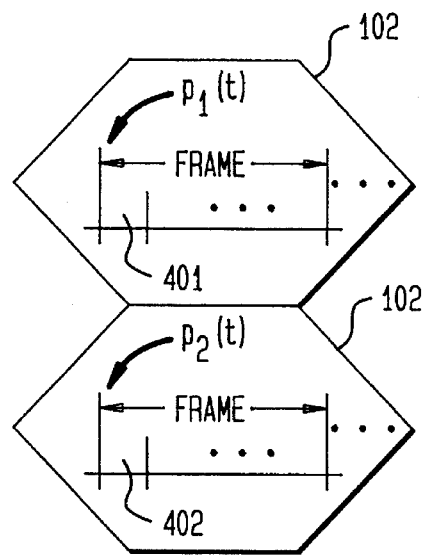
FIG. 4 illustrates two cells propagating CDMA signals in TDMA time slots.
Figure 5:
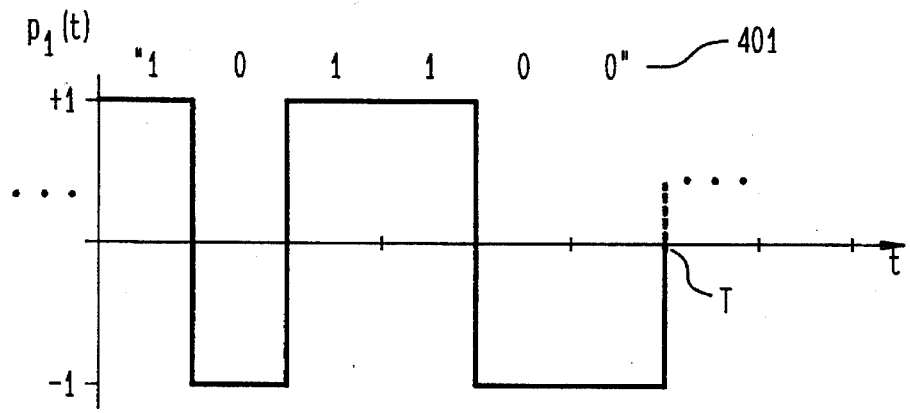
FIGS. 5 and 6 show two DS-SS signal shapes propagating during the TDMA slots of FIG. 4.
Figure 6:
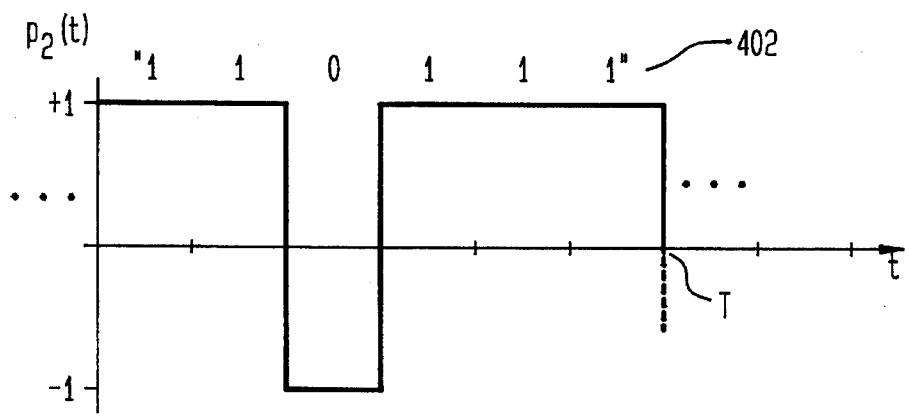

To ensure adequate interference rejection, it is important that the pulse shapes assigned to different cells have low cross-correlations. In general, there may be many ways of assigning pulse shapes $p_m(t)$ with good cross-correlation properties to different cells. For instance, with reference to FIG. 4, the shape $p_1(t)$ propagated for a user in time slot 401 in cell 101 and the shape $p_2(t)$ for a user in the corresponding time slot 402 in cell 102 are considered. Each such signal is illustratively of the type that propagates both positive and negative electrical signals having amplitudes which fall within a given dynamic range. Now with reference to FIG. 5, which is an enlargement of time interval 401, the $p_1(t)$ propagated in interval 401 provides a bit stream of rate-increased two-level level signals; without loss of generality, one level is +1 and the other level is −1 on a normalized basis. This rate-increased waveform may also be referred to with the shorthand notation "101100" (where "1" corresponds to +1 and "0" corresponds to −1). Also, a rate-increased stream corresponding to $p_2(t)$ ("110111") shown in FIG. 6 is propagated during interval 402. A primary function of each mobile unit for uplink propagation is that of converting each data symbol (which may represent, for example, a sampled and coded voice signal of a user) generated by the mobile unit to the predetermined rate-increased bit stream corresponding to given data symbol, as generally depicted by signals of FIGS. 5 or 6.

Figure 7:
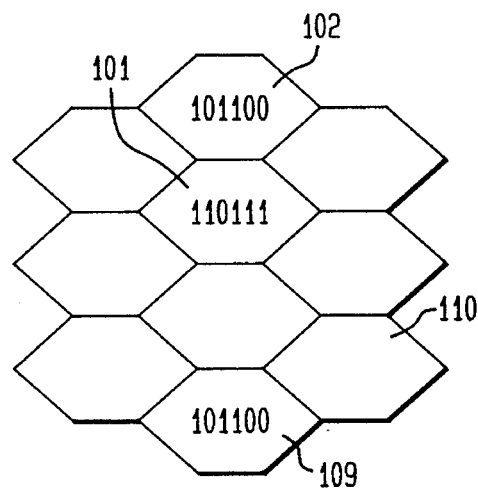
FIG. 7 depicts exemplary DS-SS signals assigned to certain cells.

The signal set selected for $p_m(t)$, m=1, 2, ..., M is such that the set has appropriate auto-correlation and cross-correlation properties. In this case, the auto-correlation property is such that, for example, if a matched filter is used in a base station receiver (say receiver 343 of FIG. 3(a)) for detection, the output of the matched filter will be above a pre-selected threshold if the incoming signal is the signal from the set for which the filter was designed, whereas the cross-correlation property means the output of the matched filter will be below a preselected threshold if the incoming signal is not the signal from the set for which the filter was designed. To complete the understanding of the code assignment, the pictorial representation of FIG. 7 shows the cellular arrangement, commensurate with FIG. 1, wherein the two codes "101100" and "10111" from an exemplary set of $p_m(t)$ are assigned to cells 101 and 102, respectively.

In analogy with frequency reuse in TDMA/FDMA, "code reuse" is possible in TDMA/CDMA. That is, the same code can be assigned to cells sufficiently far apart (e.g, cell 109 has the same code assignment as cell 102 in FIG. 7). Because the codes used in TDMA/CDMA can be designed to have small auto-correlations, interference from cells using the same code will be suppressed by a matched filter receiver. Consequently, the distance between cells using the same code in TDMA/CDMA in general need not be as great as the distance between cells assigned the same frequency band in TDMA/FDMA.

Because each cell in a hexagonal tiling illustrated in FIG. 1 has at most six nearest neighbors, it is likely that the number of significant interferers in the TDMA/CDMA scheme will be no more than six, assuming omni-directional antennas. If the interfering signals were always significantly attenuated relative to the desired intra-cell signal, then the processing gain N in equation (2) needed to maintain a desired signal-to-interference ratio (SIR) is generally small, even assuming a matched filter receiver. However, if the cells are physically adjacent, then because of shadow fading, there is a significant chance that at least one interferer is stronger than the desired intra-cell signal. In this situation a relatively large processing gain is needed to maintain the desired SIR.

The matched filter receiver is the simplest choice for the TDMA/CDMA scheme. The receiver corresponding to mobile units and the base station in cell m then makes decisions based on samples of the output of a filter with impulse response $p_m(-t)$. However, as indicated in the preceding paragraph, the processing gain (discussed in detail shortly) needed to maintain an adequate SIR with high probability for TDMA/CDMA in the presence of shadow fading would most likely be larger than the frequency reuse factor which would be used in a conventional TDMA/FDMA system. Consequently, without power control, the capacity of TDMA/CDMA with matched filter receivers is not likely to be greater than that of TDMA/FDMA. Since the capacity of TDMA/CDMA is limited by inter-cell interference, however, interference reduction techniques such as antenna sectorization, and interference suppression techniques such as described later, can be used to reduce the processing gain relative to that required for the matched filter receiver, and thereby increase capacity. (It is noted that the near-far problem, which may impair the performance of CDMA systems, is not as severe in the TDMA/CDMA system described because multiple-access interference can originate only from outside the receiver's cell. However, power control, as is used in conventional DS-SS CDMA, can be used in TDMA/CDMA to increase system capacity, either with the matched filter receiver, or with interference suppression, as will be described shortly.

Figure 8A:
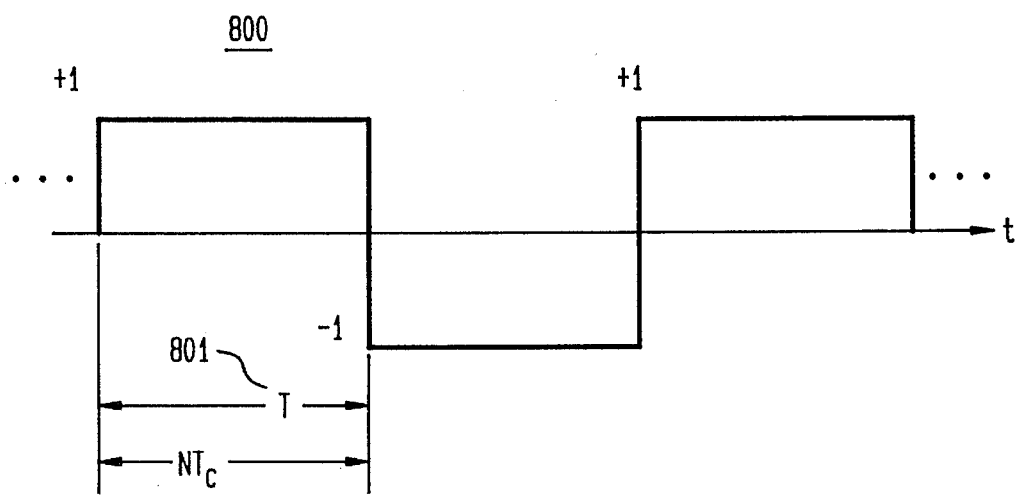
FIG. 8 depicts the relationship between a data symbol stream and the rate-increased chip bit stream propagated in correspondence to the data symbol stream.
Figure 8B:
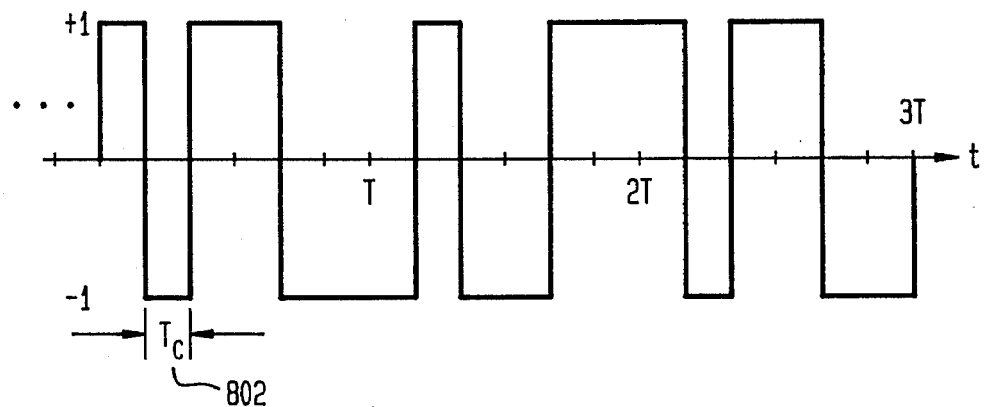

As already alluded to above, a primary function of each mobile unit (say mobile unit 350 for concreteness) is that of converting each data symbol generated within the mobile unit to a predetermined rate-increased bit stream corresponding to given data symbol, as generally depicted by signal 800 in FIG. 8. Line (i) in FIG. 8 depicts three contiguous data symbols, namely, the +1,−1,+1 symbol stream produced within mobile unit 350 at the symbol rate of 1/T, that is, the time duration of a symbol is designated as duration 801 in FIG. 8 and is denoted by T.

Line (ii) in FIG. 8 represents a rate-increased output pulse stream, say $p_1(t)$ from mobile unit 350 (also referred to as the signature stream of the associated mobile unit), corresponding to the line (i) symbol stream. As shown, a rate-increased signature stream of (+1,−1,+1,+1,−1,−1)-level pulses is propagated for each +1 in the low-rate data symbol stream; however, the negative of this signature stream is propagated for each −1 in the low-rate symbol stream.

In the rate-increased data stream shown in line (ii) of FIG. 8, the time interval of each +1 or −1 level in the rate-increased stream is designated the chip duration 802 and is denoted $T_c$. The ratio $T/T_c$ is called the "processing gain" and the ratio is denoted by N ($N = T/T_c$). Therefore, each frame is composed of a fixed number N of so-called "chips";

in FIG. 8, N=6, so six +1 and −1 chips emanate from mobile unit 350 during each frame. Thus, the signature for mobile unit 350 is the ordered set (+1,−1,+1,+1,−1,−1).

In order to communicate effectively within system 300 of FIG. 3(a), each baseband pulse $p_i(t)$, i=1, ..., M, as produced by its assigned mobile unit in response to each input symbol, may not be selected arbitrarily, but must be carefully chosen to achieve efficient, error-free communication. This means basically that each $p_i(t)$ must be selected in view of all the other $p_i(t)$'s based on such considerations as number of mobile units and the effective bandwidth of the time slots. These considerations, in turn, depend on the system requirements and transmission characteristics. Procedures for the set of baseband signals $p_i(t)$ which effect efficient information interchange for a given number of chips and mobile units are known in the art. (E.g., see U.S. Pat. No. 4,779,266). An example of another baseband signature, generated with reference to the above-identified signature (namely, (+1,−1,+1,+1,−1,−1)) is the signature given by the ordered set (+1,+1,−1,+1,+1,+1) depicted in FIG. 6.

The essential function of each receiver, such as receiver 343 in base station 340, is that of discriminating within each time slot and from among the composite of all signals arriving at the antenna of base station 340 the signature preassigned to the time slot; in the case of mobile unit 350, this would be time slot L and the signature would be the ordered set (+1,−1,+1,+1,−1,−1).

Figure 9:
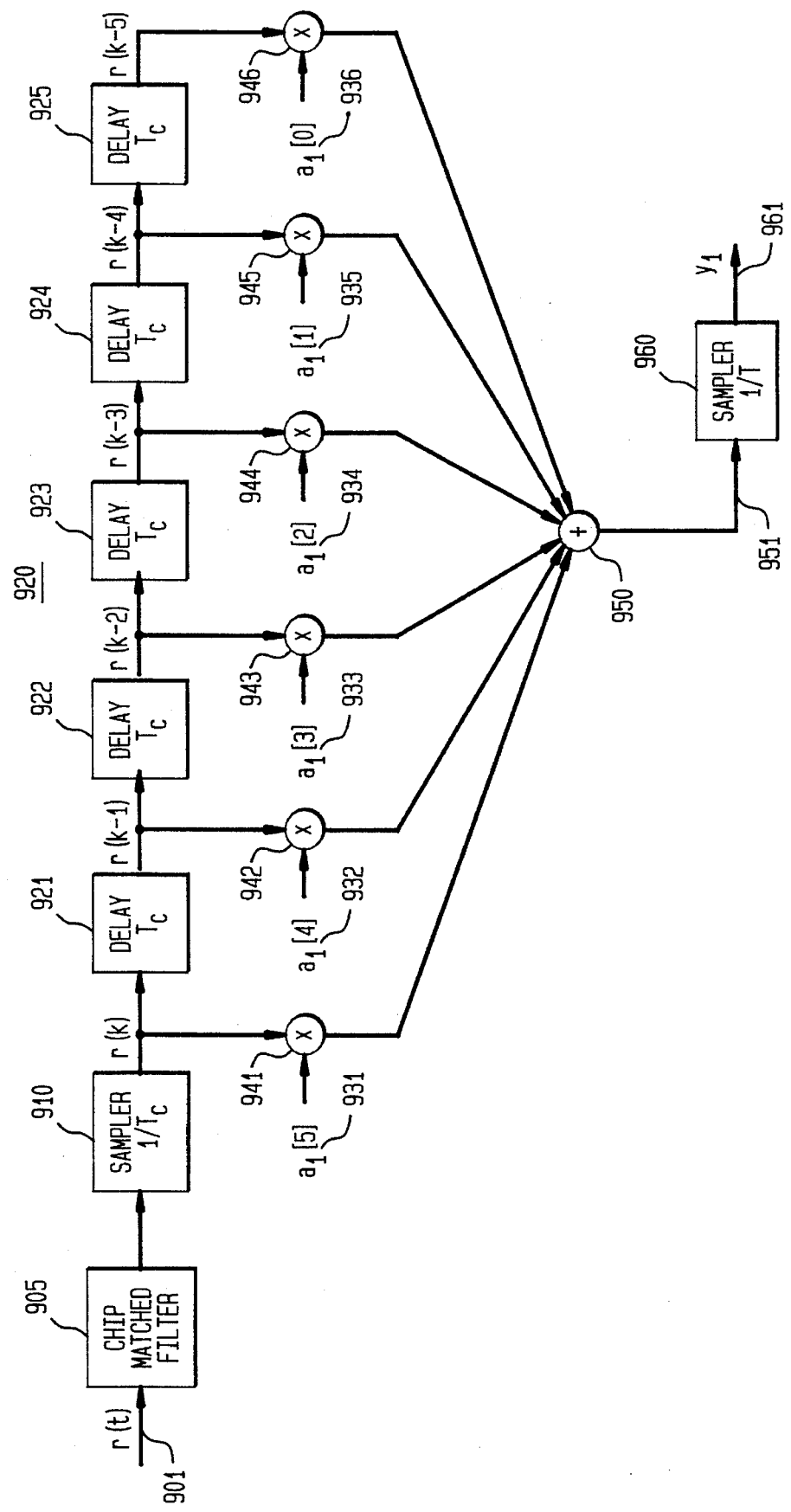
FIG. 9 illustrates a matched filter to detect a DS-SS CDMA signal in a receiver having a pre-determined signature sequence.

In one arrangement, receiver 343 is implemented by a matched filter, as now discussed with reference to FIG. 9. In FIG. 9, there is shown standard matched filter 900 for the specific case of six chip positions in a rate-increased data stream. The input, which appears on lead 901, represents the input received by the antenna of base station 340. The signal appearing on lead 901, designated r(t), in the absence of interference from other cells, is equal to the signal $p_1(t)$ plus, generally, additive noise at the input. In general, r(t) is a continuous time signal. This continuous signal serves as an input to chip matched filter 905, that is, filter 905 is a filter matched to the chip shape. The output of filter 905 is converted to a sampled data signal by sampler 910 which samples r(t) at the chip rate $T_c$; for the specific example under consideration, six samples of r(t) are taken in each frame - the samples are denoted by the set r(k), r(k-1), r(k-2), r(k-3), r(k-4), and r(k-5), with r(k) being the latest sample taken and r(k-5) corresponding to the earliest sample in a frame. In order to have access to all six samples for demodulation purposes, the samples are stored in shift register 920 composed of five delay elements 921–925 wherein each delay element provides a delay of $T_c$ seconds between its input and output. To generate the overall filter output $y_1$, appearing on lead 961: (i) the samples r(k) (k=0, ...,5) are each multiplied by a pre-specified coefficient ($a_1[k]$, k=0, ...,5 shown by reference numerals 931–936, respectively) in multipliers 941–946, respectively, to obtain resultant products; (ii) the resultant products are summed in summer 950, with the resultant sum appearing on lead 951; and (iii) the resultant sum is sampled by sampler 960 at the frame rate 1/T to produce the output $y_1$. (Typically, $y_1$ is processed by a threshold detector (not shown) to yield a bit decision corresponding to the estimate of the received symbol; in the remainder of the discussion, such a conventional threshold detector is presumed to exist, although it is not shown for sake of clarity.) In the implementation of filter 900, sample r(k) is multiplied by coefficient $a_1[5]$, r(k-1) by $a_1[4]$, ..., and r(k-5) by $a_1[0]$. In general, the $a_1[i]$'s correspond to the signature sequence assigned to the given receiver. If it is assumed that matched filter receiver 900 is configured to demodulate the first above-identified signature sequence (+1,−1,+1,+1,−1,−1), then the $a_1[i]$'s are assigned in reverse order to the signature sequence, that is, $a_1[0]$=−1, $a_1[2]$=−1, $a_1[2]$=+1, ..., $a_1[5]$=+1. Thus, whenever a data symbol is transmitted by a mobile unit assigned the same signature, $y_1$ achieves peak correlation, which in this case is the value +6 or the peak correlation value equals the number of chips. This occurs since r(k)=$a_1[k]$, k=1, ..., 5 if there are no interferers (that is, no other signatures) present and the noise is negligible, and r(5)$a_1[5]$+r(4)$a_1[4]$+ ... r(0)$a_1[0]$=+6. For comparison, on the other hand, if r(k) corresponds to the second baseband $p_2(t)$ pulse given above, then $y_1$ equals −2 since r(5)$a_1[5]$=−1, r(4)$a_1[4]$=−1, ..., and r(0)$a_1[0]$=+1.

Figure 10:
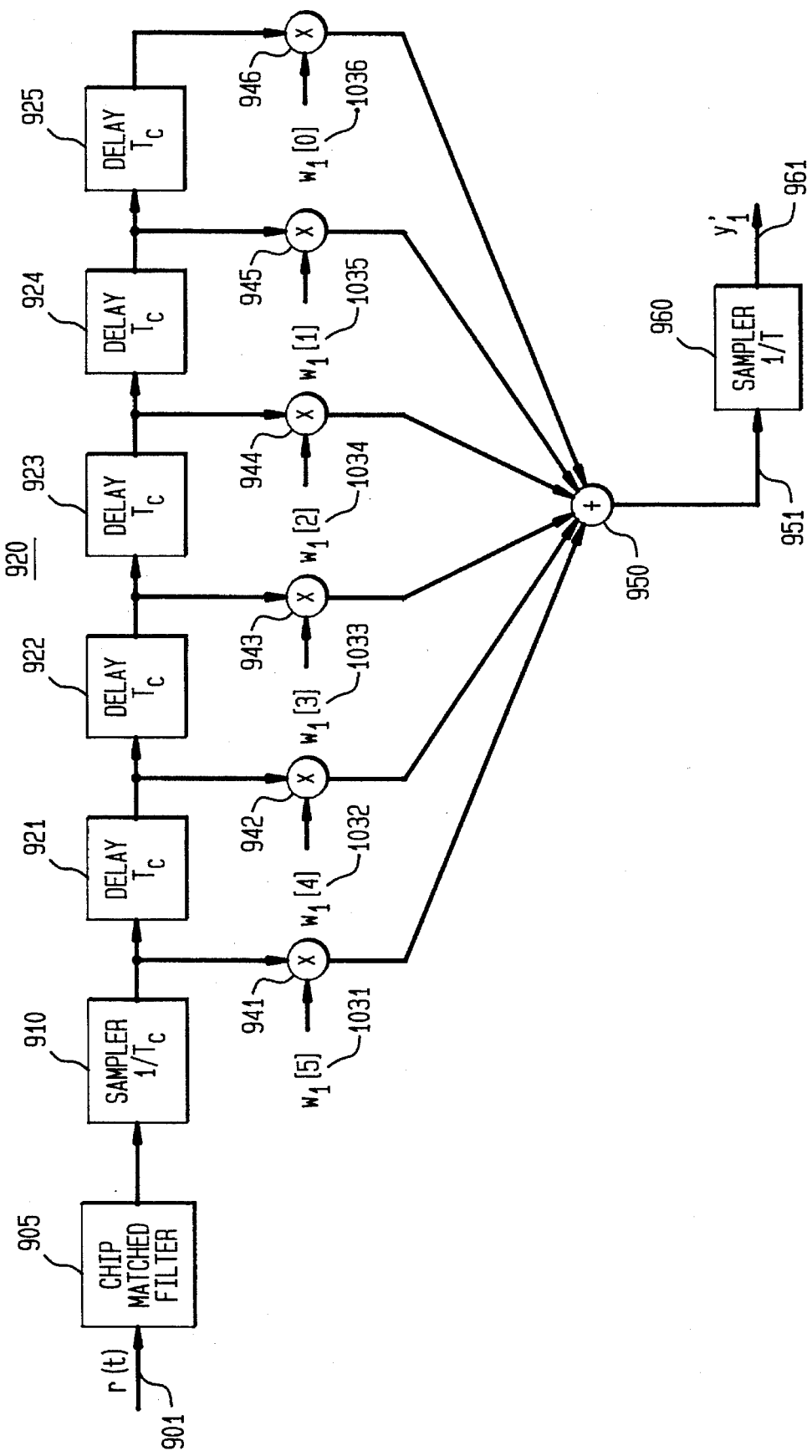
FIG. 10 illustrates an interference suppression filter to detect a DS-SS CDMA signal in a receiver having a pre-determined signature sequence.

To realize an illustrative type of interference suppression-type filter, reference is made to filter 1000 in FIG. 10. Filter 1000 has the same basic structure as filter 900 except that the coefficients $a_1(j)$'s are replaced with real numbers $w_1(j)$'s, wherein the real numbers are selected to minimize the mean squared error in the output appearing on lead 1061. The values to assign to these real numbers may typically be determined adaptively by executing a training session on arrangement 1000 prior to the transmission of any actual data values.

Figure 11:
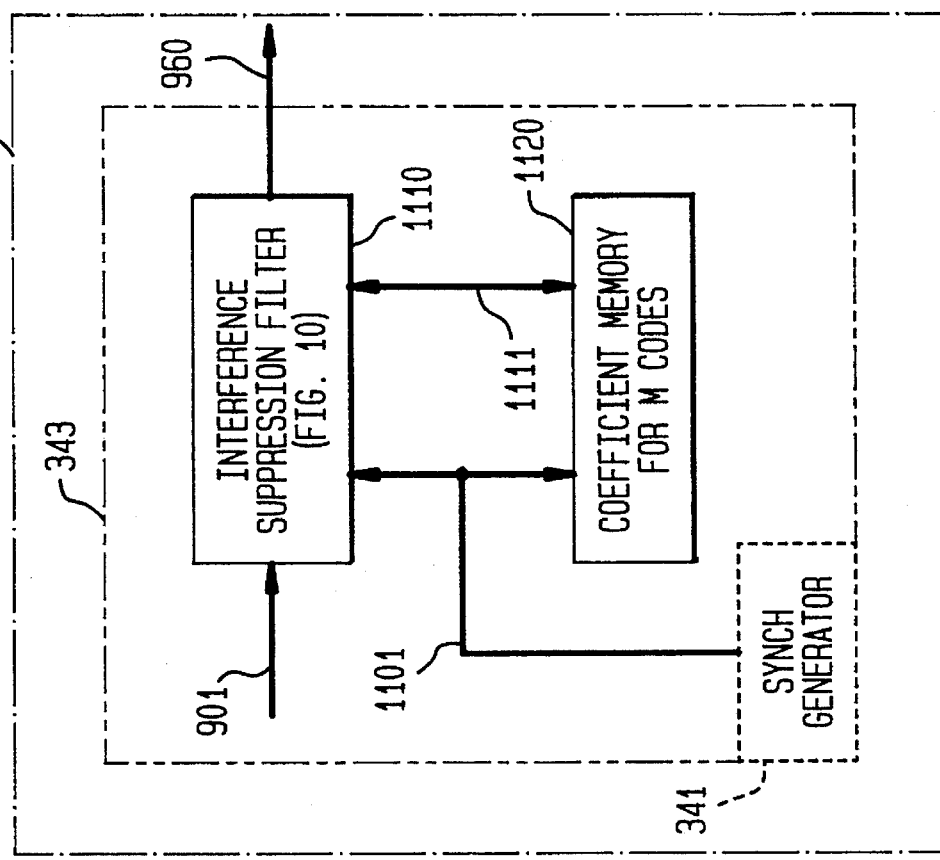
FIG. 11 depicts an arrangement for time-sharing an interference suppression filter structure by uploading adaptive coefficients applicable to each given time slot.

In order to utilize the type of interference suppression filters illustrated with reference to FIG. 10, it is necessary to supply the receiver in each base station (e.g., receiver 343) with the filter coefficients appropriate for each time slot. The arrangement of FIG. 11 illustrates one technique for supplying the proper coefficients on a time-shared basis. Filter 1110 represents any interference suppression type filters such as described with reference to FIG. 10. As each new incoming signal arrives in its assigned time slot at receiver 343, the coefficients for the filter which will demodulate the incoming signal are uploaded from coefficient memory 1120 over bus 1111, under control of a timing signal supplied over lead 1101 by synch generator 341. The coefficients, which are adaptive, can also be downloaded to memory 1120 over bus 1111 at the appropriate time under control of the clock on lead 1101. With the arrangement of elements 1110 and 1120, only one filter structure (including appropriate samplers, delay lines, multipliers, and summers) is implemented so as to minimize the required circuit components, and the components are then time-shared.

By way of generalization, it is also important to point out that, while a frequency reuse factor of one was the focus of the above discussion, inter-cell CDMA can also be used in conjunction with inter-cell FDMA. That is, adjacent cells can be assigned different or partially overlapping frequency bands, as well as different pulse shapes, to achieve additional suppression of inter-cell interference.

It is to be understood that the above-described embodiments are simply illustrative of the application of the principles in accordance with the present invention. Other embodiments may be readily devised by those skilled in the art which may embody the principles in spirit and scope. Thus, it is to be further understood that the methodology described herein is not limited to the specific forms shown by way of illustration, but may assume other embodiments limited only by the scope of the appended claims.

What is claimed is:

1. A method for communicating in a cellular communication network composed of a plurality of base stations homing on a central switching office, each of the base stations serving a plurality of mobile units, the method comprising the steps of generating TDMA time slots in each of the base stations and the mobile units, synchronizing the TDMA time slots generated in the base stations and the mobile units by propagating a synch signal from the office to each of the base stations and, in turn, to the corresponding mobile units, assigning a CDMA code from a set of CDMA codes to each cell, assigning each of the mobile units to one of the TDMA time slots, for downlink communication from an uplink base station to a downlink mobile unit, sending an outgoing information signal from the office to the uplink base station, converting the outgoing information signal in the uplink base station to an outgoing CDMA coded signal corresponding to the CDMA code assigned to the cell containing the uplink base station, and propagating the outgoing CDMA coded signal to the downlink mobile unit in the TDMA time slot assigned to the downlink mobile unit, for uplink communication from a downlink mobile unit to an uplink base station, converting an incoming information signal in the downlink mobile unit to an incoming CDMA coded signal corresponding to the CDMA code assigned to the cell containing the uplink base station, propagating the incoming CDMA coded signal to the uplink base station in the TDMA time slot assigned to the downlink mobile unit, and converting the incoming CDMA coded signal in the uplink base station to an incoming information signal for transmission to the office.

2. The method as recited in claim 1 wherein the CDMA codes correspond to Direct-Sequence, Spread-Spectrum (DS-SS)signals.

3. The method as recited in claim 1 further comprising the step of detecting the incoming CDMA coded signal and the outgoing CDMA coded signal each with a matched filter receiver.

4. The method as recited in claim 1 further comprising the step of detecting the incoming CDMA coded signal and the outgoing CDMA coded signal each with an interference-suppression receiver.

5. The method as recited in claim 1 further comprising the step of transmitting an identifier of the CDMA code assigned to each cell from each of the base stations to corresponding ones of the mobile units served by each of the base stations in one of the TDMA time slots.

6. A method for communicating in a cellular communication network composed of a plurality of base stations homing on a central switching office, each of the base stations serving a plurality of mobile units, the method comprising the steps of generating TDMA time slots in each of the base stations and the mobile units, synchronizing the TDMA time slots generated in the base stations and the mobile units by propagating a synch signal from the office to each of the base stations and, in turn, to the corresponding mobile units, assigning a CDMA code from a set of CDMA codes to each cell, transmitting an identifier of the CDMA code assigned to each cell from each of the base stations to corresponding ones of the mobile units served by each of the base stations in one of the TDMA time slots, assigning each of the mobile units to one of the TDMA time slots, for downlink communication from an uplink base station to a downlink mobile unit, sending an outgoing information signal from the office to the uplink base station, converting the outgoing information signal in the uplink base station to an outgoing CDMA coded signal corresponding to the CDMA code assigned to the cell containing the uplink base station, and propagating the outgoing CDMA coded signal to the downlink mobile unit in the TDMA time slot assigned to the downlink mobile unit, for uplink communication from a downlink mobile unit to an uplink base station, converting an incoming information signal in the downlink mobile unit to an incoming CDMA coded signal corresponding to the CDMA code assigned to the cell containing the uplink base station, propagating the incoming CDMA coded signal to the uplink base station in the TDMA time slot assigned to the downlink mobile unit, and converting the incoming CDMA coded signal in the uplink base station to an incoming information signal for transmission to the office.

7. The method as recited in claim 6 wherein the CDMA codes correspond to Direct-Sequence, Spread-Spectrum (DS-SS)signals.

8. The method as recited in claim 6 further comprising the step of detecting the incoming CDMA coded signal and the outgoing CDMA coded signal each with a matched filter receiver.

9. The method as recited in claim 6 further comprising the step of detecting the incoming CDMA coded signal and the outgoing CDMA coded signal each with an interference-suppression receiver.

10. Circuitry for communicating in a cellular communication network composed of a plurality of base stations homing on a central switching office, each of the base stations serving a plurality of mobile units, the circuitry comprising means for generating TDMA time slots in each of the base stations and the mobile units, means for synchronizing the TDMA time slots generated in the base stations and the mobile units, the means for synchronizing including means for propagating a synch signal from the office to each of the base stations and, in turn, to the corresponding mobile units, means for assigning a CDMA code from a set of CDMA codes to each cell, means for assigning each of the mobile units to one of the TDMA time slots, means for sending an outgoing information signal from the office to the uplink base station, means for converting the outgoing information signal in the uplink base station to an outgoing CDMA coded signal corresponding to the CDMA code assigned to the cell containing the uplink base station, means for propagating the outgoing CDMA coded signal to the downlink mobile unit in the TDMA time slot assigned to the downlink mobile unit, means for converting an incoming information signal in the downlink mobile unit to an incoming CDMA coded signal corresponding to the CDMA code assigned to the cell containing the uplink base station, and means for propagating the incoming CDMA coded signal to the uplink base station in the TDMA time slot assigned to the downlink mobile unit, and means for converting the incoming CDMA coded signal in the uplink base station to an incoming information signal for transmission to the office.

11. The circuitry as recited in claim 10 wherein the CDMA codes correspond to Direct-Sequence, Spread-Spectrum (DS-SS) signals.

12. The circuitry as recited in claim 10 further comprising matched filter means in the downlink mobile unit for detecting the outgoing CDMA coded signal and matched filter means in the uplink base station for detecting the incoming CDMA coded signal.

13. The circuitry as recited in claim 10 further comprising interference suppression filter means in the downlink mobile unit for detecting the outgoing CDMA coded signal and interference suppression filter means in the uplink base station for detecting the incoming CDMA coded signal.

14. The circuitry as recited in claim 10 further comprising means for transmitting the CDMA code assigned to each cell from each of the base stations to corresponding ones of the mobile units served by each of the base stations in one of the TDMA time slots.

15. Circuitry for communicating in a cellular communication network composed of a plurality of base stations homing on a central switching office, each of the base stations serving a plurality of mobile units, the circuitry comprising means for generating TDMA time slots in each of the base stations and the mobile units, means for synchronizing the TDMA time slots generated in the base stations and the mobile units, the means for synchronizing including means for propagating a synch signal from the office to each of the base stations and, in turn, to the corresponding mobile units, means for assigning a CDMA code from a set of CDMA codes to each cell, means for transmitting the CDMA code assigned to each cell from each of the base stations to corresponding ones of the mobile units served by each of the base stations, means for assigning each of the mobile units to one of the TDMA time slots, means for sending an outgoing information signal from the office to the uplink base station, means for converting the outgoing information signal in the uplink base station to an outgoing CDMA coded signal corresponding to the CDMA code assigned to the cell containing the uplink base station, means for propagating the outgoing CDMA coded signal to the downlink mobile unit in the TDMA time slot assigned to the downlink mobile unit, means for converting an incoming information signal in the downlink mobile unit to an incoming CDMA coded signal corresponding to the CDMA code assigned to the cell containing the uplink base station, means for propagating the incoming CDMA coded signal to the uplink base station in the TDMA time slot assigned to the downlink mobile unit, and means for converting the incoming CDMA coded signal in the uplink base station to an incoming information signal for transmission to the office.

16. The circuitry as recited in claim 15 wherein the CDMA codes correspond to Direct-Sequence, Spread-Spectrum (DS-SS) signals.

17. The circuitry as recited in claim 15 further comprising matched filter means in the downlink mobile unit for detecting the outgoing CDMA coded signal and matched filter means in the uplink base station for detecting the incoming CDMA coded signal.

18. The circuitry as recited in claim 15 further comprising interference suppression filter means in the downlink mobile unit for detecting the outgoing CDMA coded signal and interference suppression filter means in the uplink base station for detecting the incoming CDMA coded signal.

* * * * *

Adverse Decisions In Interference

Patent No. 5,481,533, Michael L. Honig, HYBRID INTRA-CELL TDMA/INTER-CELL CDMA FOR WIRELESS NETWORKS, Interference No. 104,191, final judgment adverse to the patentee rendered November 10, 1999, as to claims 1-18.
*(Official Gazette May 2, 2000)*